United States Patent
Yatziv et al.

(10) Patent No.: US 7,114,014 B2
(45) Date of Patent: Sep. 26, 2006

(54) METHOD AND SYSTEM FOR DATA MOVEMENT IN DATA STORAGE SYSTEMS EMPLOYING PARCEL-BASED DATA MAPPING

(75) Inventors: Michael Yatziv, Saratoga, CA (US); Satyanarayana Nishtala, Cupertino, CA (US); Whay Sing Lee, Newark, CA (US); Raghavendra J. Rao, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 118 days.

(21) Appl. No.: 10/607,770

(22) Filed: Jun. 27, 2003

(65) Prior Publication Data

US 2005/0021888 A1 Jan. 27, 2005

(51) Int. Cl.
*G06F 13/28* (2006.01)
(52) U.S. Cl. .......................... 710/23; 710/22
(58) Field of Classification Search .......... 710/23, 710/22, 27, 28, 308
See application file for complete search history.

(56) References Cited

U.S. PATENT DOCUMENTS

| | | | | |
|---|---|---|---|---|
| 5,974,480 A | * | 10/1999 | Qureshi et al. | 710/27 |
| 6,006,287 A | * | 12/1999 | Wakazu | 710/22 |
| 6,621,181 B1 | * | 9/2003 | McCombs | 307/66 |
| 6,848,061 B1 | * | 1/2005 | Kawase | 713/600 |
| 2001/0049754 A1 | * | 12/2001 | Kawase | 710/22 |
| 2002/0138697 A1 | * | 9/2002 | Kanda | 711/114 |
| 2003/0233496 A1 | * | 12/2003 | Kawase | 710/22 |
| 2004/0064590 A1 | * | 4/2004 | Starr et al. | 709/250 |

* cited by examiner

*Primary Examiner*—Fritz Fleming
*Assistant Examiner*—Harold Kim
(74) *Attorney, Agent, or Firm*—Blakely Sokoloff Taylor & Zafman LLP

(57) ABSTRACT

Embodiments of the present invention provide methods and systems for data movement in data storage systems. For one embodiment, a physical data storage parcel containing a first type of data requiring a first type of processing and a second type of data requiring a second type of processing is created. The first type of data is transferred to a first memory address space via a direct memory access operation and the second type of data is transferred to a second memory address space via the direct memory access operation. For one embodiment, the first type of data and the second type of data are copied to physically distinct data storage mediums. In an alternative embodiment, the first type of data and the second type of data are copied to distinct data storage structures of the same device. Thus, the bulk memory access operations are performed via hardware, thereby reducing performance impact.

33 Claims, 4 Drawing Sheets

METHOD AND SYSTEM FOR DATA MOVEMENT IN DATA STORAGE SYSTEMS EMPLOYING PARCEL-BASED DATA MAPPING

CROSS-REFERENCE TO RELATED APPLICATION

This application is related to co-pending Patent Application Number TBD, entitled "P8511 Title," filed "same date as this one," which is commonly assigned with the present invention.

FIELD

Embodiments of the invention relate generally to the field of data storage systems and more particularly to methods and systems for data movement in data storage systems employing parcel-based data mapping.

BACKGROUND

Typical large-scale data storage systems today include one or more dedicated computers and software systems to manage data. A primary concern of such data storage systems is that of data corruption and recovery. Data corruption may be physical (e.g., due to damage of the physical storage medium) or logical (due to errors ("bugs") in the embedded software). Embedded software bugs may cause data corruption in which the data storage system returns erroneous data and doesn't realize that the data is wrong. This is known as silent data corruption. Silent data corruption may also result from hardware failures such as a malfunctioning data bus or corruption of the magnetic storage media that may cause a data bit to be inverted or lost. Silent data corruption may also result from a variety of other causes; in general, the more complex the data storage system, more possible are the causes of silent data corruption.

Silent data corruption is particularly problematic. For example, when an application requests data and gets the wrong data, the application may crash. Additionally, the application may pass along the corrupted data to other applications. If left undetected, these errors may have disastrous consequences (e.g., irreparable, undetected, long-term data corruption).

The problem of detecting silent data corruption is addressed by creating redundancy data for each data block. Redundancy data may include error correction codes ("ECC"s) or cyclic redundancy checks ("CRC"s) or simpler error detection schemes, such as checksums, to verify the contents of a data block.

The issue of where to store the redundancy data arises. The redundancy data may typically require 8–28 bytes for each standard 512-byte block. Typical data storage systems using block-based protocols (e.g., SCSI) store data in blocks of 512 bytes in length so that all input/output ("I/O") operations take place in 512-byte blocks (sectors). One approach is simply to extend the block so that the redundancy data may be included with the system data. In some systems a physical block on the drive can be formatted as a larger size. So, instead of data blocks of 512 bytes in length, the system will now use data blocks of, for example, 520 or 540 bytes in length depending on the size of the redundancy data. The redundancy data will be cross-referenced with the actual data at the host controller. For this to be feasible, the size of the logical data block as seen by the software has to remain the same (e.g., 512 bytes), but the size of the physical block has to be increased to accommodate the redundancy data. This concept of formatting larger sectors can be implemented for some systems (e.g., those using SCSI drives).

However, not all systems use drives that allow formatting of larger sectors; ATA drives, for example, can have only 512-byte blocks. That is, they cannot be reformatted. Moreover, such a solution is often cost prohibitive because increasing the physical block size may require special purpose operations or equipment. That is, the extended data block method requires that every component of the data storage system, from the processing system, through a number of operating system software layers and hardware components, to the storage medium, be able to accommodate the extended data block. Data storage systems are frequently comprised of components from a number of manufacturers. For example, while the processing system may be designed for an extended block size, it may be using software that is designed for a 512-byte block. Additionally, for large existing data stores that use a 512-byte data block, switching to an extended block size may require unacceptable transition costs and logistical difficulties.

SUMMARY

Embodiments of the present invention provide methods and systems for data movement within data storage systems. An atomic data storage unit containing a first type of data requiring a first type of processing and a second type of data requiring a second type of processing is created. The first type of data is transferred to a first memory address space via a direct memory access operation and the second type of data is transferred to a second memory address space via the direct memory access operation.

Other features and advantages of embodiments of the present invention will be apparent from the accompanying drawings and from the detailed description that follow below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

Embodiments of the present invention provide methods and systems for data movement in data storage systems employing parcel-based data mapping. For one embodiment, a parcel-based data mapping scheme as described in co-pending U.S. Patent Application No. TBD, entitled Method and System for Parcel-Based Data Mapping, filed on TBD, by applicants and assigned to a common assignee, may be used. For such an embodiment, the parcel-based data mapping scheme allows for implementation of data integrity methods and variable size logical data blocks while the layout of the physical storage device remains unchanged. One embodiment of the parcel-based data mapping scheme provides a method for storing redundancy data, or other data, for data blocks by increasing logical data block size while retaining a specified physical block size. For such an embodiment, a virtual data storage parcel containing a number of consecutive logical data blocks is created. The logical data blocks of the virtual data storage parcel are larger than the specified size of the physical blocks and may thus contain the redundancy data or other data. The virtual data storage parcel is created through a mapping of one or more atomic physical data storage parcels. Each physical data storage parcel consists of a number of consecutive logical data blocks with each logical data block being the specified size of the physical blocks. Within the physical data storage parcel, block-level and parcel-level redundancy data (or other block or parcel parameters) are interspersed with the system data. That is, a portion of each virtual data storage parcel containing system data and block-level parameters (the data field) is stored adjacent to the parcel-level parameters (parameter field) on the external physical storage device.

Figure 1:
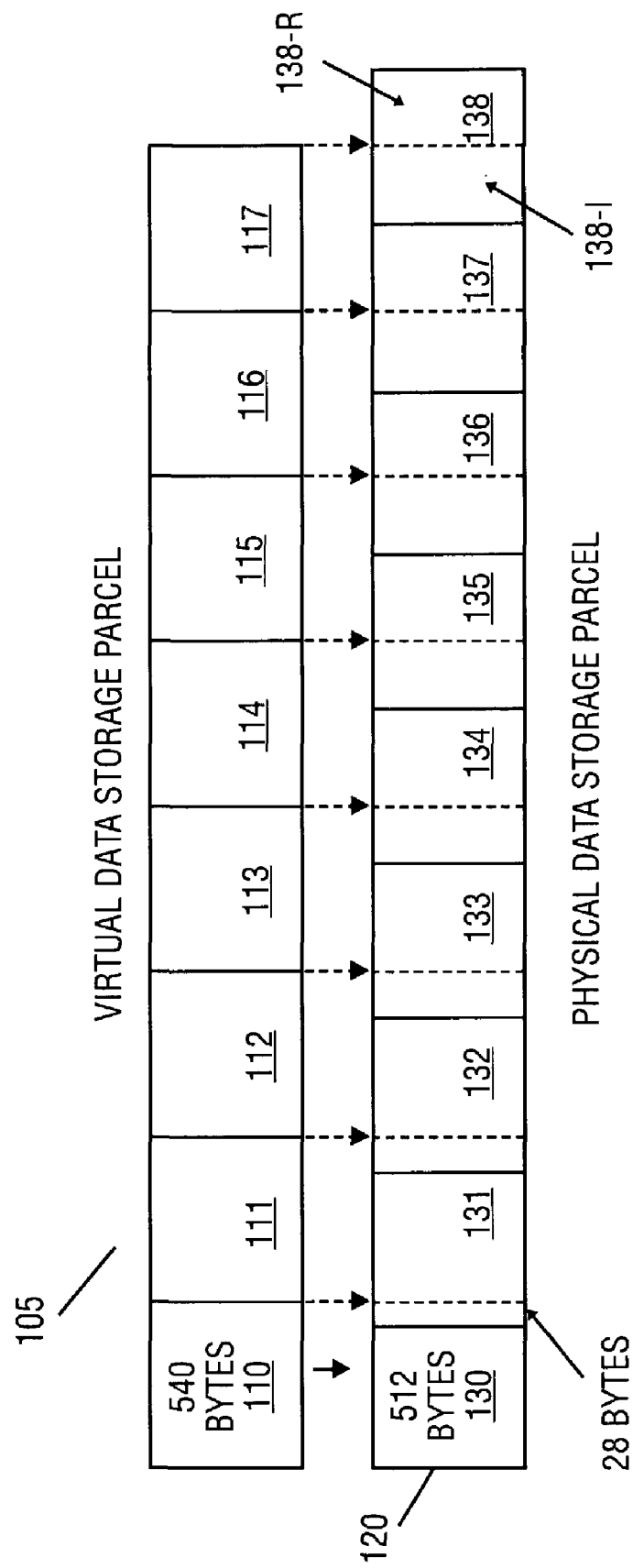
FIG. 1 illustrates a process by which the parcel data fields of one or more physical data storage parcels are copied contiguously to one memory address space and the parcel parameter fields are copied contiguously to another memory address space, in accordance with one embodiment of the invention.

FIG. 1 illustrates a mapping of a virtual data storage parcel to a physical data storage parcel for a data storage system using a standard data block size of 512 bytes in length in accordance with one embodiment of the present invention. Virtual data storage parcel 105, shown in FIG. 1, includes eight extended-size logical data blocks 110–117. The data blocks are "extended" in the sense that they are larger than the standard size data block for the particular system, in this case 512 bytes. Each extended-size logical data block of virtual data storage parcel 105 is 540 bytes in length. For alternative embodiments, the number of virtual logical data blocks in a virtual data storage parcel may vary. Moreover, the length of each logical data block may vary and may, for one embodiment, be equal to the data storage system's standard block length. That is, the virtual logical data block size may vary depending upon the amount of data (e.g., redundancy data) to be attached to each extended logical data block.

Extended-size logical data blocks 110–117 are mapped to nine standard logical data blocks 130–138 of physical data storage parcel 120. Standard logical data blocks 130–138 are each 512 bytes in length. For alternative embodiments, the number of standard logical data blocks in the physical data storage parcel may vary, as may the size of the standard logical data block. The first 512 bytes of the 540 bytes of extended-size logical data block 110 are mapped into the 512 bytes of standard logical data block 130. The remaining 28 bytes of extended-size logical data block 110 are mapped into the first 28 bytes of the 512 bytes of standard logical data block 131. The first 484 bytes of extended-size logical data block 111 are mapped into the remaining 484 bytes of standard logical data block 131, and the remaining 56 bytes of extended-size logical data block 111 are mapped into the first 56 bytes of standard logical data block 132. The process is continued until all of the extended-size logical data blocks 110–117 of virtual data storage parcel 105 are mapped into the standard logical data blocks 130–138 of physical data storage parcel 120. Upon completion of mapping, standard logical data block 138 will have data stored in the initial 224 bytes labeled 138-I, the remaining 288 bytes, labeled 138-R, may be used to store redundancy or other data pertaining to the entire physical data storage parcel 120.

However, some data access algorithms require the data fields of consecutive virtual data storage parcels to be transferred, to or from memory, contiguously without the interspersed parameter fields. Likewise, data access algorithms may require the parameter fields of consecutive virtual data storage parcels to be transferred, to or from memory, contiguously without the interspersed data fields. This separation of data fields from parameter fields may be accomplished by transferring the virtual data storage parcel(s) to cache memory, because it cannot be accessed directly on the storage device, and then parsing the data via a software algorithm from within the cache. However, for I/O operations to be performed satisfactorily from the standpoint of the host processing system, the bulk of data transfer must be accomplished through hardware; it is not practical to move the data via software.

For one embodiment, the smallest contiguous storage unit of a data storage system is a data storage parcel. A virtual data storage parcel consists of a number of logical blocks that may be of variable length to accommodate block-level redundancy or other data. Collectively, this data is the parcel data field. The logical blocks of the virtual data storage parcel are mapped to a physical data storage parcel consisting of a greater number of standard-size logical blocks. The additional logical blocks of the physical data storage parcel provide for the storage of the block-level redundancy data as well as parcel-level redundancy data in a parcel parameter field. To effect this, a direct memory access ("DMA") mapping is implemented in which the parcel data field of one or more parcels is copied to one memory address space (e.g., cache memory) contiguously, and the parcel parameter field of one or more parcels is copied via hardware to another address space for processing. For one embodiment, the parcel data fields and parcel parameter fields are copied to physically distinct data storage mediums. In an alternative embodiment, the parcel data fields and parcel parameter fields are copied to distinct data storage structures of a single physical device.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Process

Figure 2:
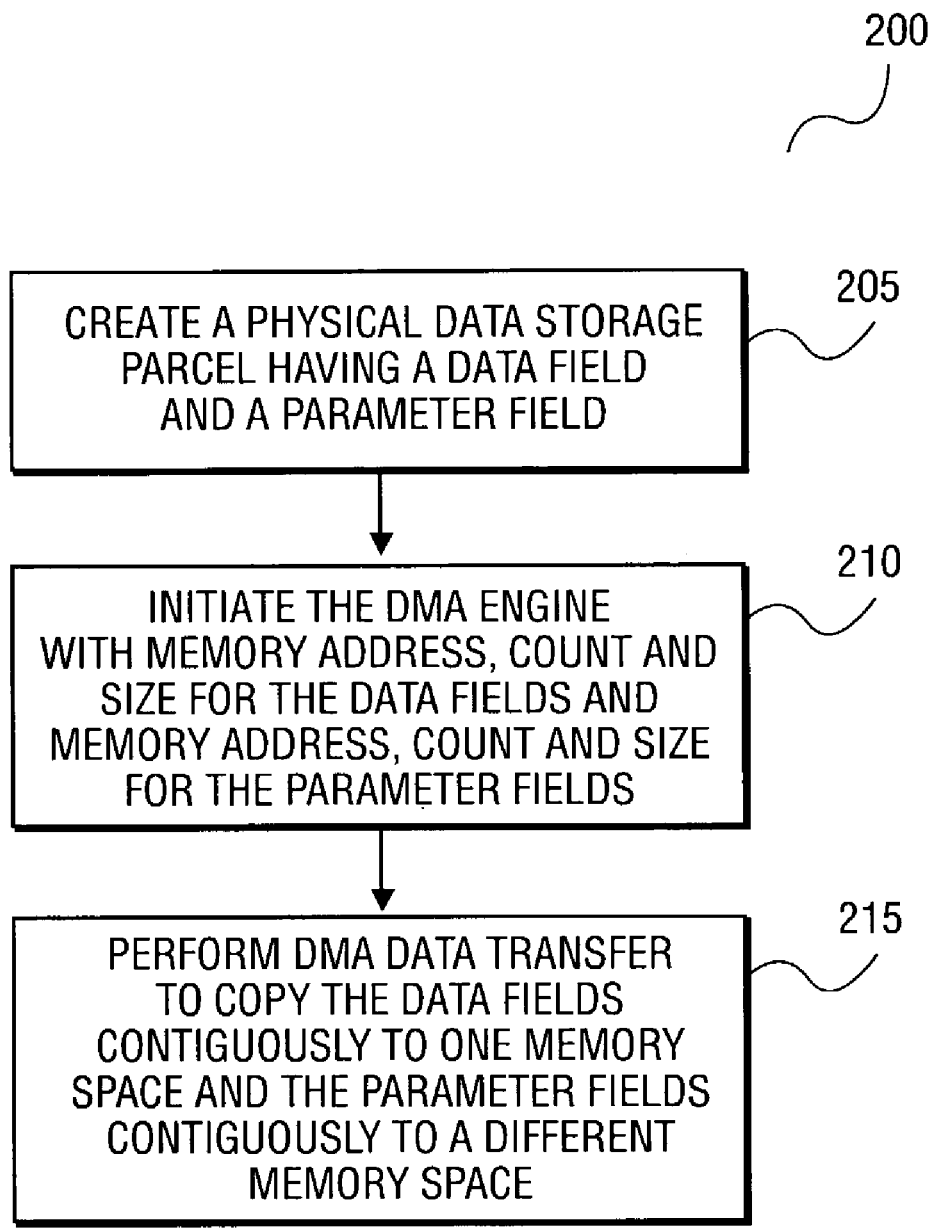
FIG. 2 is a graphical representation of the DMA data transfer process in accordance with one embodiment of the invention.

FIG. 2 illustrates a process by which the parcel data fields of one or more physical data storage parcels are copied contiguously to one memory address space and the parcel parameter fields are copied contiguously to another memory address space, in accordance with one embodiment of the invention. Process 200, shown in FIG. 2, begins with operation 205 in which physical data storage parcels are created. For one embodiment, each physical data storage parcel consists of nine standard size data blocks of 512 bytes each. A virtual data storage parcel consisting of eight logical data blocks each having an amount of block-level redundancy data, typically from 8–20 bytes, is mapped to the physical data storage parcel. This provides enough data storage to accommodate the extended logical data blocks of the virtual data storage parcel and accommodate the parcel parameter field. In alternative embodiments, the physical data storage parcel may include, for example, redundancy data and/or other special use data such as time stamp data, use attribute data, statistical data, or cache history data. Such data may be implemented as block-level data and parcel-level data.

At operation 210 a DMA engine is initialized with two sets of DMA initialization ("DMAI") parameters. The first set of DMAI parameters specifies the memory address, count and size for the parcel data fields. The second set of DMAI parameters specifies the memory address, count and size for the parcel parameter fields. For one embodiment, the second set of DMAI parameters may include an indication that a parcel parameter field transfer is not required. For example, in such cases a NULL indicator may replace the specified memory address for the parcel parameter field within the second DMAI parameter set.

At operation 215 a DMA data transfer is performed. The DMA data transfer allows the data of the physical data storage parcel to be striped to different memory locations without going through the central processing unit ("CPU"). Upon DMA completion all parcel data fields will be located contiguously in a memory address space starting with the specified memory address contained in the first DMAI parameter set. If transfer of any parcel parameter fields was required, such parcel parameter fields will be located contiguously in a memory address space starting with the specified memory address contained in the second DMAI parameter set. That is, the two portions of the physical data storage parcel (i.e., the data field and the parameter field) may be processed by different pieces of the embedded software. Thus, the bulk of memory access operations may be performed via DMA, thereby reducing performance impact of the processing system.

Figure 3:
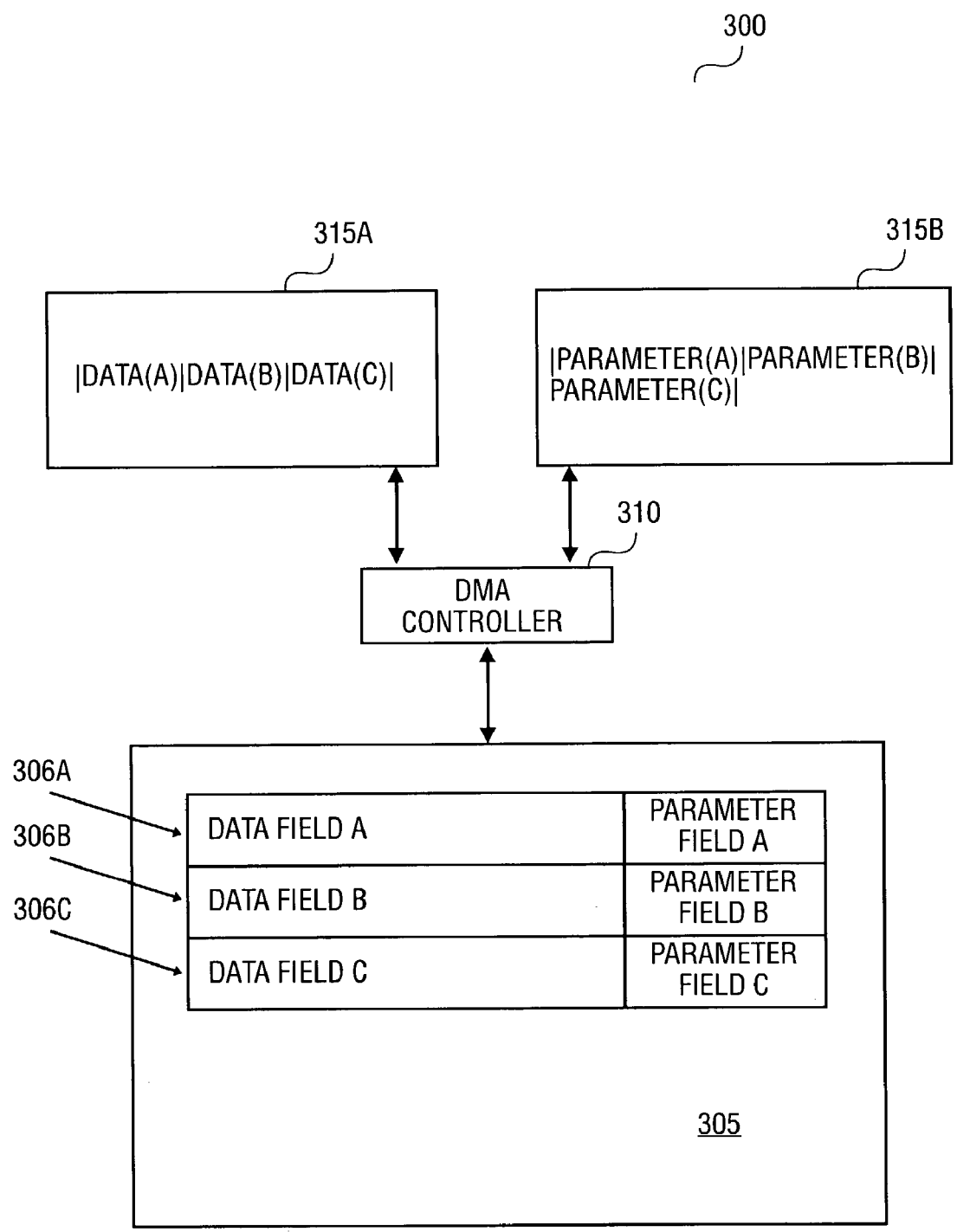
FIG. 3 illustrates an exemplary data storage system in which a DMA data transfer scheme may be implemented in accordance with an embodiment of the present invention.

FIG. 3 is a graphical representation of the DMA data transfer process described above in reference to FIG. 3. System 300, shown in FIG. 3, includes a mass storage device 305 having stored therein three physical data storage parcels 306A–306C. Each data storage parcel has a parcel data field, namely data fields A–C, and a parcel parameter field, namely parameter fields A–C. DMA controller 310 stripes the data field from each physical data storage parcel and copies each data field, A–C, to memory address space 315A. Data fields A–C are located contiguously in memory address space 315A, which may be, for example, the cache memory of a host processing system. If the data transfer process requires a parameter field transfer, the DMA controller stripes the parameter fields A–C from each physical data storage parcel and copies each parameter field A–C, to memory address space 315B. Parameter fields A–C are located contiguously in memory address space 315B for use by different software (storage system software) or different processors. For one embodiment, memory address space 315A and memory address space 315B are separate memory structures located in the same physical hardware. In alternative embodiments, memory address space 315A and memory address space 315B may be located in distinct physical hardware.

System

Figure 4:
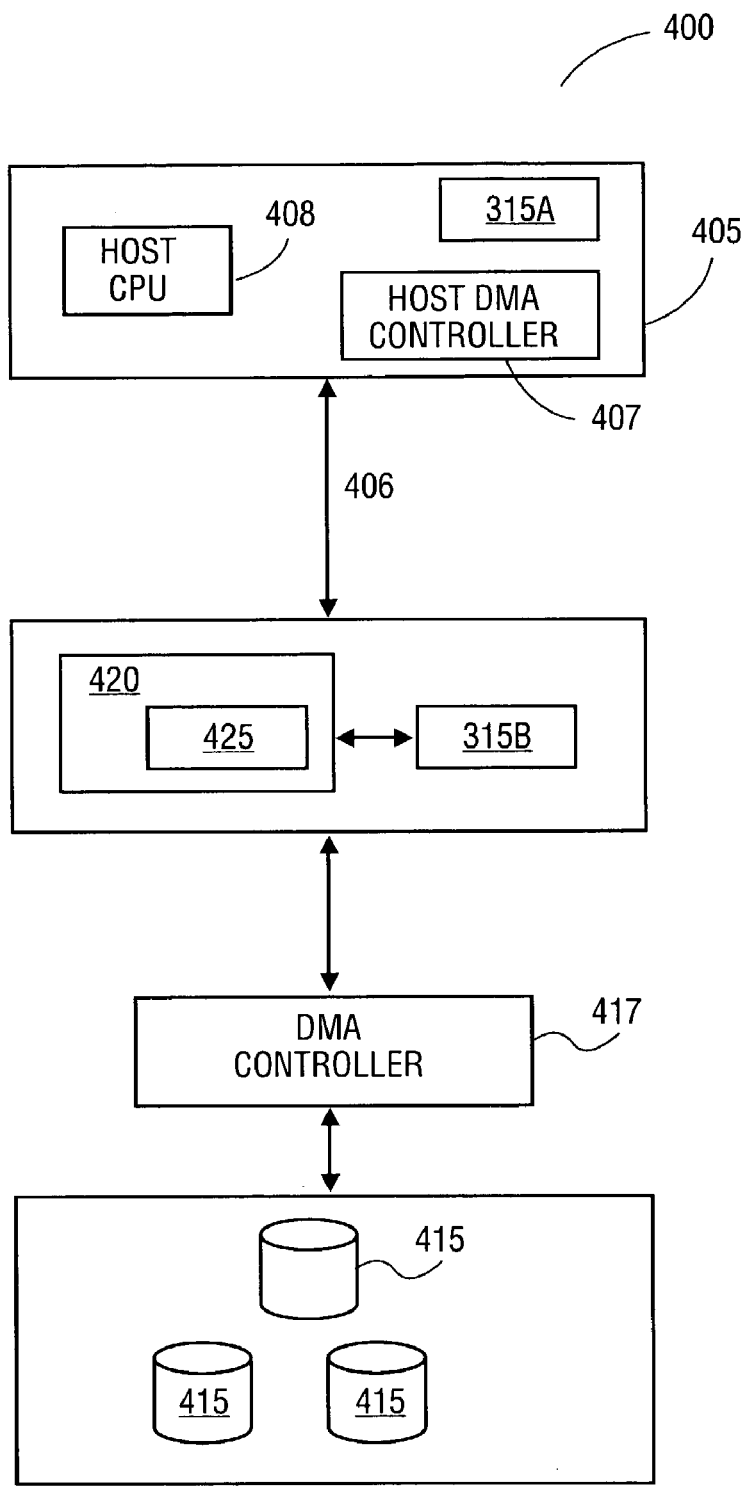
FIG. 4 illustrates an exemplary data storage system in which a DMA data transfer scheme may be implemented in accordance with an embodiment of the present invention.

FIG. 4 illustrates an exemplary data storage system in which a DMA data transfer scheme may be implemented in accordance with an embodiment of the present invention. The method of the present invention may be implemented using the data storage system shown in FIG. 4. The data storage system 400 shown in FIG. 4 contains one or more mass storage devices 415 that may be, for example, magnetic or optical storage media.

Data storage system 400 also contains one or more internal processors, shown collectively as the CPU 420. The CPU 420 may include a control unit, an arithmetic unit and several registers with which to process information. CPU 420 provides the capability for data storage system 400 to perform tasks and execute software programs stored within the data storage system. For one embodiment, the data storage system 400, shown in FIG. 4, may include a processing system 405 (such as a PC, workstation, server, mainframe or host system). Users of the data storage system may be connected to the server 405 via a local area network (not shown). The data storage system 400 communicates with the processing system 405 via a bus 406 that may be a standard bus for communicating information and signals and may implement a block-based protocol (e.g., SCSI or fibre channel). The CPU 420 is capable of responding to commands from processing system 405.

The DMA controller 417 accesses the physical data storage parcels stored in mass storage devices 415 and transfers the parcel data fields directly to a specified memory address space, such as the cache memory 315A of processing system 405. The parcel data fields of each physical data storage parcel of the DMA operation are stored contiguously in the specified memory address space. If the DMA data transfer requires a parcel parameter field transfer, the DMA controller transfers the parcel parameter fields directly to a specified memory address space, such as the storage system software 315B. The parcel parameter fields of each physical data storage parcel of the DMA operation are, likewise, stored contiguously in the specified memory address space. Thus, various data types may be transferred to specified memory address spaces, which may mean transfer to separate processors within the data storage system, directly through a DMA operation, without the involvement of the storage system processor.

The process of DMA data transfer in accordance with the present invention may be implemented by hardware and/or software contained within the data storage device 400. For example, the CPU 420 may contain a memory 425 that may be random access memory ("RAM") or some other machine-readable medium for storing program code that may be executed by CPU 420.

It is understood that many alternative configurations for a data storage system in accordance with alternative embodiments are possible. For example, the embodiment shown in FIG. 4 may have the DMA data transfer method of one embodiment implemented via the DMA controller 417. The DMA data transfer method may additionally or alternatively be effected by a host DMA controller 407.

General Matters

Embodiments of the invention may be applied to provide methods for DMA data transfer in data storage systems employing parcel-based data mapping. To effect this, a data mapping scheme is implemented in which the parcel data field of one or more parcels is copied to one memory address space (e.g., cache memory) contiguously, and the parcel parameter field of one or more parcels is copied via hardware to another address space for processing. For one embodiment, the DMA data transfer methods are a result of balancing size overhead and performance overhead considering DMA scatter-gather operations, hardware complexity and application program interfaces.

As described above in reference to operation 210, for one embodiment the DMA engine is initialized with memory address, count and size for the parcel data fields and the parcel parameter fields. For one embodiment, the size of the data fields and the size of the parameter fields is fixed for all physical data storage parcels within the scope of the DMA data transfer.

For one embodiment, the parcel data fields and parcel parameter fields are copied to physically distinct data storage mediums. In an alternative embodiment, the parcel data fields and parcel parameter fields are copied to distinct data storage structures of a single physical device.

Various alternative embodiments of the method of the present invention may be implemented anywhere within the block-based portion of the I/O datapath. The datapath includes all software, hardware, or other entities that manipulate the data from the time that it enters block form on write operations to the point where it leaves block form on read operations. The datapath extends from the computer that reads or writes the data (converting it into block form) to the storage device where the data resides during storage. For example, the datapath includes software modules that stripe or replicate the data, the disk arrays that store or cache the data blocks, the portion of the file system that manages data in blocks, the network that transfers the blocks, etc.

The invention includes various operations. It will be apparent to those skilled in the art that the operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    creating an atomic data storage unit containing a first type of data requiring a first type of processing and a second type of data requiring a second type of processing; and
    transferring the first type of data to a first memory address space via a direct memory access operation and transferring the second type of data to a second memory address space via the direct memory access operation, wherein the atomic data storage unit is a physical data storage parcel created by mapping a plurality of virtual logical data storage blocks of a virtual data storage parcel to a plurality of physical logical data storage blocks of the physical data storage parcel, the virtual logical blocks of a first size and the physical logical blocks of a second size.

2. The method of claim 1 wherein the first type of data is system data contained in a parcel data field and the second type of data is parameter data contained in a parcel parameter field.

3. The method of claim 2 wherein the first memory address space is a cache memory of a host processing system.

4. The method of claim 2 wherein the first type of processing consists of data validation.

5. The method of claim 2 wherein the parcel parameter field contains parcel-level redundancy data.

6. The method of claim 5 wherein the parcel-level redundancy data is selected from the group consisting of an error correction code, a checksum and a cyclic redundancy code.

7. The method of claim 2 further comprising:
    initializing a direct memory access engine with a first set of initialization parameters specifying a memory address, a count and a size for each parcel data field and a second set of initialization parameters specifying a memory address, a count and a size for each parcel parameter field.

8. The method of claim 7 wherein the size of each parcel data field and the size of each parcel parameter field is fixed for a scope of the direct memory access operation.

9. The method of claim 1 wherein the virtual data storage parcel includes eight virtual logical data blocks, the eight virtual logical data blocks mapped to a physical data storage parcel including nine physical logical data storage blocks.

10. The method of claim 9 wherein the nine physical logical data blocks are 512 bytes in length.

11. The method of claim 10 wherein the size of each virtual logical data block varies within a data storage system.

12. A data storage system comprising:
    a storage medium having stored thereon a plurality of atomic data storage units containing a first type of data requiring a first type of processing and a second type of data requiring a second type of processing; and
    a direct memory access controller coupled to the storage medium configured to transfer the first type of data to a first memory address space via a direct memory access operation and transfer the second type of data to a second memory address space via the direct memory access operation, wherein the atomic data storage unit is a physical data storage parcel created by mapping a plurality of virtual logical data storage blocks of a virtual data storage parcel to a plurality of physical logical data storage blocks of the physical data storage parcel, the virtual logical blocks of a first size and the physical logical blocks of a second size.

13. The data storage system of claim 12 wherein the first type of data is system data contained in a parcel data field and the second type of data is parameter data contained in a parcel parameter field.

14. The data storage system of claim 13 wherein the first memory address space is a cache memory of a host processing system.

15. The data storage system of claim 13 wherein the first type of processing consists of data validation.

16. The data storage system of claim 13 wherein the parcel parameter field contains parcel-level redundancy data.

17. The data storage system of claim 16 wherein the parcel-level redundancy data is selected from the group consisting of an error correction code, a checksum and a cyclic redundancy code.

18. The data storage system of claim 13 wherein the direct memory access controller is initialized with a first set of initialization parameters specifying a memory address, a count and a size for each parcel data field and a second set of initialization parameters specifying a memory address, a count and a size for each parcel parameter field.

19. The data storage system of claim 18 wherein the size of each parcel data field and the size of each parcel parameter field is fixed for a scope of the direct memory access operation.

20. The data storage system of claim 12 wherein the virtual data storage parcel includes eight virtual logical data blocks, the eight virtual logical data blocks mapped to a physical data storage parcel including nine physical logical data storage blocks.

21. The data storage system of claim 20 wherein the nine physical logical data blocks are 512 bytes in length.

22. The data storage system of claim 21 wherein the size of each virtual logical data block varies within a data storage system.

23. An apparatus comprising:
    means for creating an atomic data storage unit containing a first type of data requiring a first type of processing and a second type of data requiring a second type of processing; and
    means for transferring the first type of data to a first memory address space via a direct memory access operation and transferring the second type of data to a second memory address space via the direct memory access operation, wherein the atomic data storage unit is a physical data storage parcel created by mapping a plurality of virtual logical data storage blocks of a virtual data storage parcel to a plurality of physical logical data storage blocks of the physical data storage parcel, the virtual logical blocks of a first size and the physical logical blocks of a second size.

24. The apparatus of claim 23 wherein the first type of data is system data contained in a parcel data field and the second type of data is parameter data contained in a parcel parameter field.

25. The apparatus of claim 24 wherein the first memory address space is a cache memory of a host processing system.

26. The apparatus of claim 24 wherein the first type of processing consists of data validation.

27. The apparatus of claim 24 wherein the parcel parameter field contains parcel-level redundancy data.

28. The apparatus of claim 27 wherein the parcel-level redundancy data is selected from the group consisting of an error correction code, a checksum and a cyclic redundancy code.

29. The apparatus of claim 24 further comprising:
    means for initializing a direct memory access engine with a first set of initialization parameters specifying a memory address, a count and a size for each parcel data field and a second set of initialization parameters specifying a memory address, a count and a size for. each parcel parameter field.

30. The apparatus of claim 29 wherein the size of each parcel data field and the size of each parcel parameter field is fixed for a scope of the direct memory access operation.

31. The apparatus of claim 23 wherein the virtual data storage parcel includes eight virtual logical data blocks, the eight virtual logical data blocks mapped to a physical data storage parcel including nine physical logical data storage blocks.

32. The apparatus of claim 31 wherein the nine physical logical data blocks are 512 bytes in length.

33. The apparatus of claim 32 wherein the size of each virtual logical data block varies within a data storage system.

* * * * *